(12) United States Patent
Kim et al.

(10) Patent No.: US 12,368,186 B2
(45) Date of Patent: Jul. 22, 2025

(54) ELECTRODE ASSEMBLY AND APPARATUS AND METHOD FOR MANUFACTURING THE SAME

(71) Applicant: LG Energy Solution, Ltd., Seoul (KR)

(72) Inventors: Jin Gon Kim, Daejeon (KR); Byeong Kyu Lee, Daejeon (KR); Su Taek Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 118 days.

(21) Appl. No.: 17/945,314

(22) Filed: Sep. 15, 2022

(65) Prior Publication Data

US 2023/0079827 A1 Mar. 16, 2023

(30) Foreign Application Priority Data

Sep. 16, 2021 (KR) .................. 10-2021-0124049
Sep. 16, 2021 (KR) .................. 10-2021-0124050
Sep. 16, 2021 (KR) .................. 10-2021-0124051

(51) Int. Cl.
*H01M 10/04* (2006.01)
*H01M 10/0583* (2010.01)
(Continued)

(52) U.S. Cl.
CPC ... *H01M 10/0583* (2013.01); *H01M 10/0404* (2013.01); *H01M 10/0459* (2013.01); *H01M 50/461* (2021.01); *H01M 50/466* (2021.01)

(58) Field of Classification Search
CPC ......... H01M 10/0404; H01M 10/0459; H01M 10/0583; H01M 50/461; H01M 50/466; Y02E 60/10; Y02P 70/50
See application file for complete search history.

(56) References Cited

U.S. PATENT DOCUMENTS 6,051,342 A 4/2000 Hamano et al.
2004/0154160 A1 8/2004 Hong
(Continued)

FOREIGN PATENT DOCUMENTS

CN 112259802 A 1/2021
EP 1261063 A2 11/2002
(Continued)

OTHER PUBLICATIONS

Extended European Search Report including Written Opinion for Application No. 22195484.5 dated Feb. 13, 2023, pp. 1-11.
(Continued)

*Primary Examiner* — Michael A Tolin
(74) *Attorney, Agent, or Firm* — Lerner David LLP

(57) ABSTRACT

An apparatus for manufacturing an electrode assembly includes a separator supply unit, a table, a separator guide, and first and second upper adhesive supply units. The separator supply unit is configured for supplying a separator sheet from which a separator is formed. The table is configured for supporting a plurality of electrodes and sections of the separator sheet. The separator guide is configured for guiding the separator sheet to fold in a particular folding direction. The first and the second upper adhesive supply units are configured for applying an adhesive to respective sections of the separator sheet. The table is configured for rotating in a first rotational direction such that a first table side of the table moves closer to the second upper adhesive supply unit and in a second rotational direction such that a second table side of the table moves closer to the first adhesive supply unit.

14 Claims, 10 Drawing Sheets

(51) Int. Cl.
  *H01M 50/46* (2021.01)
  *H01M 50/466* (2021.01)

(56) References Cited

U.S. PATENT DOCUMENTS

| | | | |
|---|---|---|---|
| 2011/0104567 A1 | 5/2011 | Lee | |
| 2015/0044555 A1 | 2/2015 | Lee | |
| 2016/0152874 A1 | 6/2016 | Beard | |
| 2020/0235434 A1 | 7/2020 | Lee et al. | |
| 2022/0069332 A1 | 3/2022 | Jung et al. | |
| 2022/0158304 A1 | 5/2022 | Choi et al. | |
| 2023/0042848 A1 | 2/2023 | Hosokawa et al. | |
| 2023/0142362 A1* | 5/2023 | Jung | H01M 10/0459 29/623.4 |

FOREIGN PATENT DOCUMENTS

| | | | |
|---|---|---|---|
| JP | 2012527738 A | 11/2012 | |
| JP | 2015197977 A | 11/2015 | |
| JP | 2017016946 A | 1/2017 | |
| JP | 2017050215 A | 3/2017 | |
| JP | 6570926 B2 | 9/2019 | |
| JP | 2019186229 A | 10/2019 | |
| JP | 6619902 B1 | 12/2019 | |
| JP | 2024514334 A | 4/2024 | |
| JP | 2024515078 A | 4/2024 | |
| JP | 2024515079 A | 4/2024 | |
| KR | 19980064181 A | 10/1998 | |
| KR | 101084075 B1 | 11/2011 | |
| KR | 20120023367 A | 3/2012 | |
| KR | 20120060325 A | 6/2012 | |
| KR | 101220981 B1 | 1/2013 | |
| KR | 20190054491 A | 5/2019 | |
| KR | 20200023852 A | 3/2020 | |
| KR | 20200023853 A | 3/2020 | |
| KR | 20200023854 A | 3/2020 | |
| KR | 20200089452 A | 7/2020 | |
| KR | 20200092760 A | 8/2020 | |
| KR | 20210031152 A | 3/2021 | |
| KR | 20210073451 A | 6/2021 | |
| KR | 20210119786 A | 10/2021 | |
| WO | 2021131880 A1 | 7/2021 | |
| WO | WO-2021194285 A1 * | 9/2021 | |

OTHER PUBLICATIONS

International Search Report for Application No. PCT/KR2022/013704 mailed Jan. 2, 2023, pp. 1-3.

International Search Report for Application No. PCT/KR2022/013705 mailed Jan. 4, 2023, pp. 1-3.

International Search Report for Application No. PCT/KR2022/013708 mailed Dec. 27, 2022, pp. 1-3.

* cited by examiner

ELECTRODE ASSEMBLY AND APPARATUS AND METHOD FOR MANUFACTURING THE SAME

CROSS-REFERENCE TO RELATED APPLICATIONS

The present application claims priority from Korean Patent Application Nos. 2021-0124050, filed on Sep. 16, 2021, 2021-0124049, filed on Sep. 16, 2021, 2021-0124051, filed on Sep. 16, 2021, the disclosures of which are hereby incorporated herein by reference in their entireties.

FIELD

The present disclosure relates to an electrode assembly, e.g., one for use in a battery cell, an apparatus for manufacturing the electrode assembly, and a method for manufacturing the electrode assembly, and more particularly, to an electrode assembly in which an electrode and a separator sheet are stacked in a Z-folding (i.e., zigzag-folding) type and the electrode is at least inhibited from being separated from a fixed relative position in the electrode assembly along with an apparatus and a method for manufacturing such an electrode assembly.

BACKGROUND

Generally, the types of secondary batteries (e.g., rechargeable batteries) include nickel-cadmium batteries, nickel-hydrogen batteries, lithium-ion batteries, lithium-ion polymer batteries, and the like. Such secondary batteries are used not only for smaller applications and in small-sized products such as digital cameras, P-DVD, MP3P, cellular phones, PDA, portable game devices, power tools and E-bikes, but also for larger applications and larger-sized products demanding high output, such as electric and hybrid vehicles and power storage devices which may be used for storing surplus generated power or new renewable energy or for providing backup power.

In order to manufacture such a secondary battery, first, the electrode active material slurry is applied to a cathode current collector and an anode current collector to prepare a cathode and an anode, which are respectively stacked on opposite sides of a separator, thereby forming an electrode assembly having a predetermined shape. Then, the electrode assembly is housed in a battery case, an electrolytic solution is injected, and the case is then sealed to form a battery cell.

Electrode assemblies are classified into various types. For example, a simple stack type is one in which cathodes, separators, and anodes simply overlap with each other and are continuously stacked without manufacturing a unit cell (e.g., an elementary or fundamental battery unit comprising a cathode, a separator, and an anode), a lamination & stack (L&S) type in which unit cells are first manufactured using cathodes, separators, and anodes and then stacked, a stack & folding (S&F) type in which a plurality of unit cells are spaced apart and attached to one surface of an elongated separator sheet and the separator sheet is repeatedly folded in the same direction from one end, the Z-folding type in which a plurality of electrodes or unit cells are alternately attached to one surface and the other surface of an elongated separator sheet, and the separator sheet is repeatedly folded in alternating directions starting from one end of the separator sheet, and the like. Among them, the Z-folding type has high degrees of alignment and electrolytic solution impregnation, and thus this type has often been used in recent years.

Moreover, conventionally, after the electrodes and the separator sheet are stacked in this Z-folding type, no separate stacking alignment process is performed such that, due to the electrodes and the separator sheet being separable at this juncture in the process, the electrodes become displaced from their fixed positions in the electrode assembly. To solve this problem, a separate stacking alignment process is often performed after stacking the electrodes and the separator sheet, but this process can increase the overall thickness of the stacked body of the electrodes and the separator sheet such that heat is not sufficiently transferred to the interior of the stacked body and the adhesive strength is lowered. Additionally, even when a separate stacking alignment process is performed, the electrodes can be displaced from their fixed positions in the electrode assembly during the process of transferring the stacked body. This problem can be further aggravated depending on the material of the separator sheet when the adhesive strength of the separator sheet itself is low.

Therefore, there is a need to develop a Z-folding type electrode assembly having improved performance in use, e.g., when used in battery cells, while preventing relative displacement of the electrodes from their fixed positions in the electrode assembly as well as an apparatus and method for manufacturing such an assembly.

SUMMARY OF THE DISCLOSURE

It is an object of the present disclosure to provide an electrode assembly, which may be for use in a battery cell and further in a battery, in which electrodes and a separator sheet may be stacked in a Z-folding type and the electrodes may be prevented or otherwise inhibited from being displaced from a fixed position relative to the electrode assembly. An apparatus and a method for manufacturing such an electrode assembly objects of this disclosure.

The objects of the present disclosure are not limited to the aforementioned objects, and other objects which are not expressly described herein should be clearly understood to be encompassed by the present disclosure by those skilled in the art from the following detailed description and the accompanying drawings.

According to an aspect of the present disclosure, an apparatus for manufacturing an electrode assembly may include a separator supply unit, a table, a separator guide, and first and second upper adhesive supply units. The electrode assembly, after being manufactured, may include a plurality of electrodes and a separator that may be folded in a zigzag manner around alternating side portions of each of the electrodes and may cover upper and lower surfaces of each of the electrodes. The separator supply unit may be configured for supplying a separator sheet from which the separator is formed. The table may be configured for supporting the plurality of electrodes and sections of the separator sheet. The separator guide may be configured for guiding the separator sheet to fold in a particular folding direction. The first and the second upper adhesive supply units may be configured for applying an adhesive to respective ones of the sections of the separator sheet. The table may be configured for rotation in a first rotational direction such that a first table side of the table moves closer to the second upper adhesive supply unit and in a second rotational direction such that a second table side of the table opposite the first table side moves closer to the first upper adhesive supply unit.

In some arrangements of the apparatus for manufacturing an electrode assembly, the first electrode may be seated on a first region of the separator sheet, and the second electrode may be seated on a second region of the separator sheet.

In some arrangements, the apparatus for manufacturing the electrode assembly may further include a first electrode supply unit configured for supplying a first electrode sheet. In some such arrangements, the first electrode supply unit may be a first electrode reel. from which the first electrode sheet, on which a plurality of first electrodes of the plurality of electrodes may be formed, may be unwound. In some such arrangements, the apparatus may further include a second electrode supply unit. In such arrangements, the second electrode supply unit may be a second electrode reel from which a second electrode sheet, on which a plurality of second electrodes of the plurality of electrodes may be formed, may be unwound.

In some arrangements of the apparatus for manufacturing an electrode assembly, the separator supply unit may be a separator reel from which the separator sheet may be unwound when the separator sheet is supplied by the separator supply unit.

In some arrangements of the apparatus for manufacturing an electrode assembly, the separator sheet may include a first section configured for supporting a first electrode of the plurality of electrodes seated on the first section of the separator sheet and a second section configured for supporting a second electrode of the plurality of electrodes seated on the second section of the separator sheet. In some such arrangements, the first upper adhesive supply unit, which may be a first upper nozzle, may be configured for applying the adhesive to at least a part of the second section of the separator sheet when the first section of the separator sheet is supported by the table. The second upper adhesive supply unit, which may be a second upper nozzle, may be configured for applying the adhesive to at least a part of a third section of the separator sheet when at least the first electrode and the second section of the separator sheet are supported by the table.

In some arrangements of the apparatus for manufacturing an electrode assembly, either one or both of the first upper adhesive supply unit is configured for rotation such that an end part of the first upper adhesive supply unit moves toward the separator sheet and the second upper adhesive supply unit is configured for rotation such that an end part of the second upper adhesive supply unit moves toward the separator sheet.

In some arrangements of the apparatus for manufacturing an electrode assembly, the first upper adhesive supply unit and the second upper adhesive supply unit may be arranged relative to the separator guide such that the separator sheet may extend between the first upper adhesive supply unit and the second upper adhesive supply unit when the separator sheet is being supplied by the separator supply unit.

In some arrangements of the apparatus for manufacturing an electrode assembly, he first upper adhesive supply unit may be moveable and may be configured such that when the first electrode is seated on the first section of the separator sheet, the first upper adhesive supply unit may move, e.g., linearly, to a position over the second section of the separator sheet. The second upper adhesive supply unit may be moveable and may be configured such that when second electrode is seated on the second section of the separator sheet, the second upper adhesive supply unit may move, e.g., linearly, to a position over the third section of the separator sheet.

In some arrangements of the apparatus for manufacturing an electrode assembly, the separator guide may be moveable and may be configured such that when the first upper adhesive supply unit applies the adhesive to the second section of the separator sheet, the separator guide may move, e.g., linearly, in a first separator guide direction away from the table (which, in some arrangements, may be toward the second electrode reel). The separator guide may be moveable and may be configured such that when the second upper adhesive supply unit applies the adhesive to the third section of the separator sheet, the separator guide may move, e.g., linearly, in a second separator guide direction opposite the first separator guide direction.

In some arrangements of the apparatus for manufacturing an electrode assembly, upon completion of the adhesive application of the first upper adhesive supply unit to the second section of the separator sheet, the separator guide may move, e.g., linearly, in the second separator guide direction and thereby move the separator sheet such that the second section of the separator sheet applied with the adhesive covers the first electrode. Upon completion of the adhesive application of the second upper adhesive supply unit to the third section of the separator sheet, the separator guide may move, linearly, in the first separator guide direction and thereby move the separator sheet such that the third section of the separator sheet applied with the adhesive covers the second electrode.

In some arrangements, the apparatus for manufacturing an electrode assembly further may include a lower adhesive supply unit, e.g., a lower nozzle, configured for applying the adhesive to either one of or both a lower portion of the first electrode and a lower portion of the second electrode.

In some arrangements, the apparatus for manufacturing an electrode assembly further may include a first electrode delivery unit, e.g., a first header, and a second electrode delivery unit, e.g., a second header. The first electrode delivery unit may be configured for carrying, e.g., by adsorbing, the first electrode and then seating the first electrode on the first section. The second electrode delivery unit may be configured for carrying, e.g., by adsorbing, the second electrode and then seating the second electrode on the second section. In such arrangements, the first electrode delivery unit and the second electrode delivery unit may be configured for rotation in a reciprocating motion towards and away from the table.

In some arrangements of the apparatus for manufacturing an electrode assembly, when the first electrode is being carried by the first electrode delivery unit, the lower adhesive supply unit may apply the adhesive to the lower portion of the first electrode, and when the second electrode is being carried by the second electrode delivery unit, the lower adhesive supply unit or another lower adhesive supply unit may apply the adhesive to the lower portion of the second electrode.

In some arrangements, the apparatus for manufacturing an electrode assembly further may include a first transfer device configured for transferring, e.g., by conveying, the first electrode toward the table and a second transfer device configured for transferring, e.g., by conveying, the second electrode toward the table. In some such arrangements, the first transfer device and the second transfer device may be arranged to be on opposite sides of the separator sheet when the separator sheet is being supplied by the separator supply unit.

In some arrangements, the first transfer device may include a first opening, e.g., a first groove, exposed to the first electrode so that the lower adhesive supply unit applies the adhesive to the lower portion of the first electrode via the first opening. The second transfer device may include a second opening, e.g., a second groove exposed to the second electrode so that the one of the lower adhesive supply unit or the other lower adhesive supply unit applies the adhesive to the lower portion of the second electrode via the second opening.

In some arrangements of the apparatus for manufacturing an electrode assembly, the separator guide, the first upper adhesive supply unit, the second upper adhesive supply unit, and the table may be configured such that the respective sections of the separator sheet to which the first and the second upper adhesive supply units are configured for applying the adhesive extend between the separator guide and the table when the adhesive is applied by the respective ones of the first and the second upper adhesive supply unites.

In some arrangements of the apparatus for manufacturing an electrode assembly, the separator guide and the first and the second upper adhesive supply units may be configured for translating together over the table when the table is rotated.

According to another aspect of the present disclosure, an electrode assembly, which for example may be used for a battery cell, may be manufactured by a process. In this process, a separator sheet may be seated on a table along a separator guide. A first adhesive layer may be applied to a lower portion of a first electrode. The first electrode with the first adhesive layer applied to the lower portion of the first electrode may be seated on a first section of the separator sheet. A second adhesive layer may be applied to at least a part of a second section of the separator sheet. The separator sheet may be folded so that the second section of the separator sheet with the second adhesive layer applied may cover an upper portion of the first electrode and the second adhesive layer.

In some arrangements of the process of manufacturing an electrode assembly, a first electrode sheet supplied from a first electrode supply unit may be cut to form a plurality of the first electrodes. In some such arrangements, the first electrode sheet may be unwound from a first electrode reel in being supplied from the first electrode supply unit.

In some arrangements of the process of manufacturing an electrode assembly, the separator sheet may be supplied from a separator supply unit. In some such arrangements, the separator supply unit may be a separator reel from which the separator sheet may be unwound when the separator sheet is supplied by the separator supply unit.

In some arrangements of the process of manufacturing an electrode assembly, the separator sheet may be folded by moving the separator guide linearly.

In some arrangements of the process of manufacturing an electrode assembly, the first adhesive layer may be applied from a first lower adhesive supply unit, and the second adhesive layer may be applied from a first upper adhesive supply unit. In this process and after the step of covering the upper portion of the first electrode, a third adhesive layer may be applied to a lower portion of a second electrode from the first lower adhesive supply unit or a second lower adhesive supply unit. A second electrode with the third adhesive layer applied to the lower portion of the second electrode may be seated on the second section of the separator sheet. A fourth adhesive layer may be applied to at least a part of a third section of the separator sheet from a second upper adhesive supply unit The separator sheet may be folded so that the third section of the separator sheet applied with the fourth adhesive layer may cover the second electrode.

In some arrangements of the process of manufacturing an electrode assembly, the table may be rotated in a first rotational direction such that a first table side of the table moves closer to the second upper adhesive supply unit or in a second rotational direction such that a second table side of the table opposite the first table side moves closer to the first upper adhesive supply unit. In some such arrangements, the separator guide, the first upper adhesive supply unit, and the second upper adhesive supply unit may be translated, e.g., may linearly reciprocate left and right. relative to the table during the application of the second adhesive layer or the fourth adhesive layer. In some such arrangements, the table may support the one or more sections the table is configured for supporting during rotation of the table.

In some arrangements of the process of manufacturing an electrode assembly, the first adhesive supply unit may be a first nozzle and the second adhesive supply unit may be a second nozzle. In such arrangements, when applying the adhesive by the first upper nozzle, the first upper nozzle may be rotated to move an end part of the first upper nozzle toward the separator sheet (e.g., such that the end part of the first upper nozzle is adjacent the separator sheet), or when applying the adhesive by the second upper nozzle, rotating the second upper nozzle to move an end part of the second upper nozzle toward the separator sheet (e.g., such that the end part of the second upper nozzle is adjacent the separator sheet).

In some arrangements of the process of manufacturing an electrode assembly, the second section may extend between the table and a separator guide during the application of the second adhesive layer.

According to another aspect of the present disclosure, an electrode assembly may include a first electrode, a second electrode, and a separator sheet. The separator sheet may have a zigzag shape formed by being folded about the first and the second electrodes such that the first electrode is seated on a first section of the separator sheet, a second section of the separator sheet covers the first electrode, the second electrode is seated on the second section, and a third section of the separator sheet covers the second electrode. One or more adhesive layers may be formed between each of the electrodes and the separator sheet. In some arrangements, the separator sheet may be cut to form a separator.

In some arrangements of the electrode assembly, a first adhesive layer may be located between a lower portion of the first electrode and the separator sheet, and a second adhesive layer may be located between the upper portion of the first electrode and the separator sheet. In some such arrangements, the first adhesive layer and the second adhesive layer may be respectively formed by an adhesive applied in the form of a plurality of dots.

According to another aspect of the present disclosure, an electrode assembly for use in a battery cell may include first and second electrodes, a separator sheet from which a separator may be formed, and an adhesive. The first and second electrodes may be alternately stacked and separated from each other by the separator sheet that may be folded between the first and second electrodes in a zigzag shape. The adhesive may be arranged either one of or both between the separator sheet and the first electrode and between the separator sheet and the second electrode. The adhesive may be configured to be dissolved in an electrolytic solution for use in a battery cell only upon application of either one of or both heat and pressure applied to the stacked ones of the first electrode, the second electrode, and the separator sheet.

According to yet another aspect of the present disclosure, a battery cell may include an electrode assembly according to any of the foregoing electrode assemblies. The battery cell may include a battery case that may house or otherwise enclose an electrode assembly together with an electrolytic solution. The adhesive layer may be dissolved in the electrolytic solution.

According to another aspect of the present disclosure, an electrode assembly, which may be for use in a battery cell, may include first and second electrodes, a separator sheet stacked with the first and the second electrodes in a Z-folding type, and an adhesive. The adhesive may be applied to upper and lower portions of one of or both the first and the second electrodes. In this manner, the one or both of electrodes to which the adhesive is applied may be prevented or otherwise inhibited, e.g., substantially inhibited, from being displaced from a fixed position in the electrode assembly. According to additional aspects of the present disclosure, an apparatus and a process may be configured for manufacturing the electrode assembly.

The effects of the present disclosure are not limited to the effects mentioned above and additional other effects not described above will be clearly understood from the description of the appended claims by those skilled in the art.

DETAILED DESCRIPTION

Figure 1:
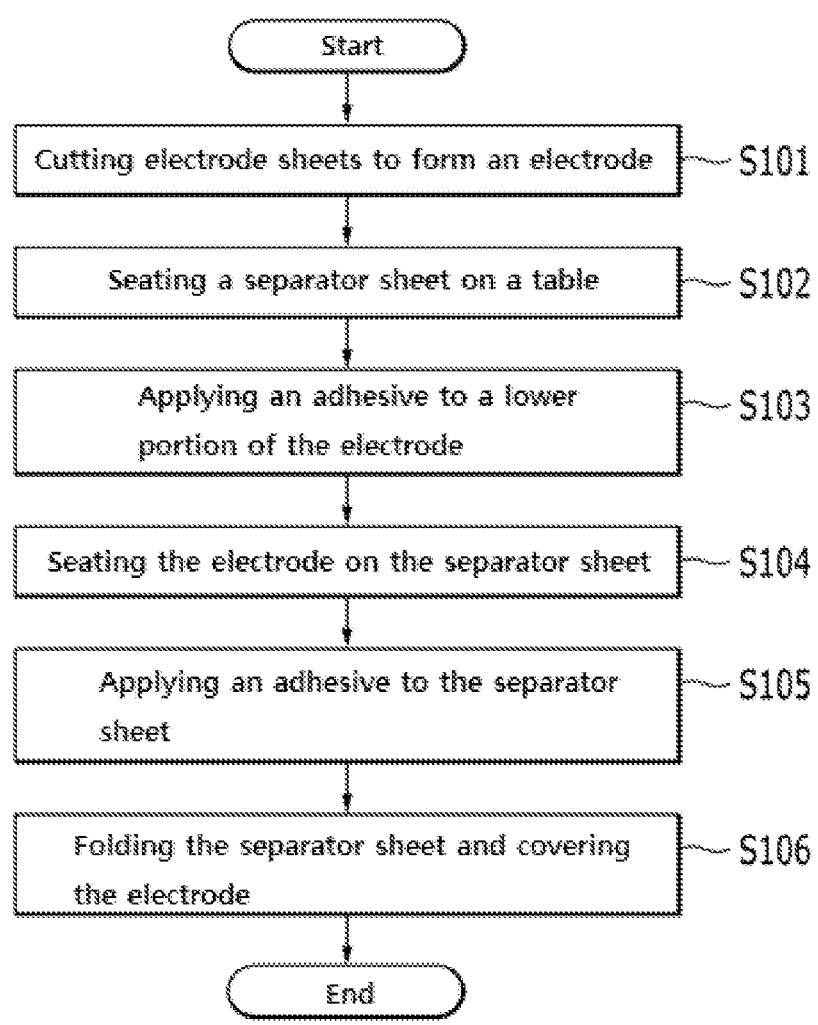
FIG. 1 is a flowchart of a process for manufacturing an electrode assembly according to an example of the present disclosure.

Hereinafter, various examples of the present disclosure will be described in detail with reference to the accompanying drawings so that those skilled in the art can easily carry them out. The present disclosure may be modified in various ways and is not limited to the examples set forth herein.

Portions that are irrelevant to the description may be omitted to clearly describe the present disclosure, and like reference numerals designate like elements throughout the description.

Further, in the drawings, the size and thickness of each element may be arbitrarily illustrated for convenience of description, and the present disclosure is not necessarily limited to those illustrated in the drawings. In the drawings, the thickness of layers, regions, etc. may be exaggerated for clarity. In the drawings, for convenience of description, the thicknesses of some layers and regions may be exaggerated.

Further, throughout the description, when a portion is referred to as "including" or "comprising" a certain component, it means that the portion can further include other components or elements, without excluding the other components or elements, unless otherwise stated.

Hereinafter, a method of and apparatus for manufacturing an electrode assembly, which may be for use in a battery cell, according to examples of the present disclosure will be described.

Figure 2:
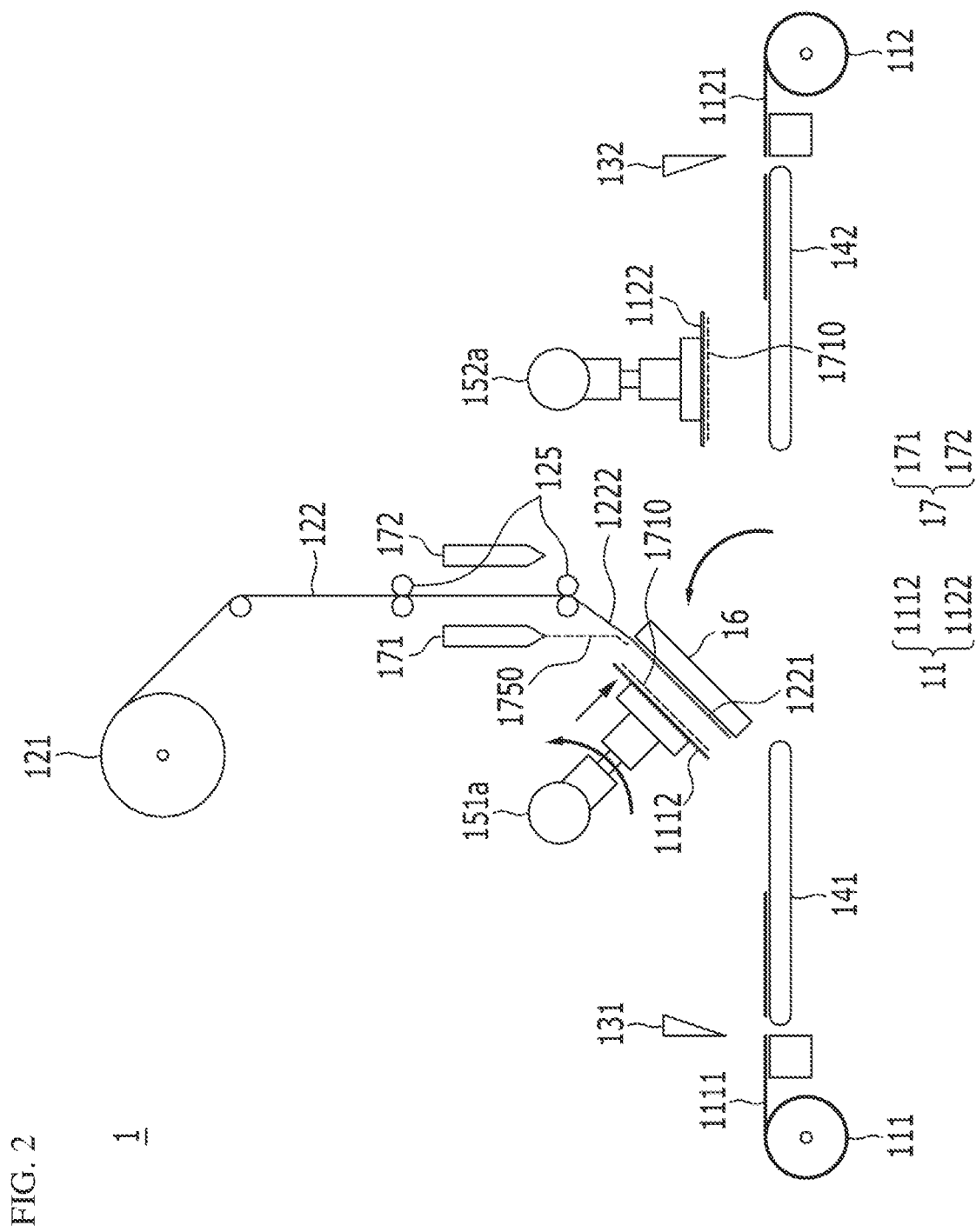
FIG. 2 is a schematic elevation view of an apparatus for manufacturing an electrode assembly according to an aspect of the present disclosure, which shows a state in which a first electrode on which an adhesive has been applied is being seated on a first region of a separator sheet.

Referring to FIGS. 1 and 2, in a process for manufacturing an electrode assembly, which may be of a Z-folding type, electrode sheets 1111 and 1121 are cut to form an electrode 11 (S101). A separator sheet 122 is seated on the table 16 (S102). An adhesive is applied to the lower portion of the electrodes 11 (e.g., electrodes 1112 and 1122) (S103). The electrodes 11 (e.g., electrodes 1112 and 1122) are seated on the separator sheet 122 (S104). An adhesive is applied on the separator sheet 122 (S105). The separator sheet 122 is folded such that the separator sheet applied with the adhesive covers the electrodes 11 (e.g., electrodes 1112 and 1122) (S106). In this manner, the electrodes 11 (e.g, electrodes 1112 and 1122) adhered to the separator sheet 122, respectively, during the stacking of the electrodes 11 and the separator sheet 122 in a Z-folding type can be prevented from being displaced from a fixed position in the electrode assembly.

Hereinafter, each step shown in the flowchart of FIG. 1 will be specifically described with reference to FIGS. 2 to 7.

An electrode assembly manufacturing apparatus 1 includes electrode reels 111 and 112 from which electrode sheets 1111, 1112 may be unwound, a separator reel 121 from which separator sheet 122 may be unwound, a table 16, a separator guide 125, and a pair of upper nozzles 17. A plurality of the electrodes 11 may be formed from the unwound electrode sheets. The separator sheet 122 is foldable to cover upper and lower surfaces of the electrodes 11 and thereby to be stacked with the electrodes 11. The table 16 supports the electrodes 11 and portions of the separator sheet 122 seated on or over the table. The separator guide 125 guides the separator sheet 122 in a folding direction of the separator sheet 122. The pair of upper nozzles 17 apply an adhesive between the table 16 and the separator guide 125, e.g., onto sections of the separator sheet 122 extending between the table and the separator guide when the separator sheet is unwound from the separator reel 121.

The electrode reels 111 and 112 are reels on which the electrode sheets 1111 and 1121 are wound and from which the electrode sheets 1111 and 1121 are unwound. When unwound, the electrode sheets 1111 and 1121 are cut to respectively form first electrodes 1112 and second electrodes 1122 or in-process portions of such electrodes. More specifically, according to the present example, the first electrode reel 111 is a reel on which the first electrode sheet 1111 is wound, and the first electrode sheet 1111 is unwound from the first electrode reel 111. Further, the second electrode reel 112 is a reel on which the second electrode sheet 1121 is wound, and the second electrode sheet 1121 is unwound from the second electrode reel 112.

Here, the electrode sheets 1111 and 1121 can be manufactured by applying a slurry of an electrode active material, a conductive material, and a binder onto an electrode current collector, and then drying and pressing the slurry. However, manufacturing the electrode sheets 1111 and 1121 is not limited to this process and other processes generally accepted in the art may be utilized for manufacturing the electrode sheets 1111 and 1121 for use in manufacturing the electrode assembly in accordance with the present disclosure.

More specifically, the first electrode sheet 1111 and the second electrode sheet 1121 may include electrode active materials having different polarities from each other. That is, the first electrode 1112 and the second electrode 1122 may be electrodes 11 having different polarities from each other. As an example, if the first electrode 1112 is a cathode, the second electrode 1122 may be an anode. As another example, if the first electrode 1112 is an anode, the second electrode 1122 may be a cathode.

The separator reel 121 is a reel on which the separator sheet 122 is wound, and the separator sheet 122 may be unwound from the separator reel 121. After that, the separator sheet 122 is stacked with the electrodes 11 formed by cutting the electrode sheets 1111 and 1121. Here, the electrodes 11 are alternately stacked onto the separator sheet 122 in a Z-folding type. More specifically, in the present example, when the first electrode 1112 is seated on the separator sheet 122, one side is folded to cover the first electrode 1112, and when the second electrode 1122 is seated, the other side is folded to cover the second electrode 1122 such that the separator sheet 122 has a zigzag form.

The table 16 supports the electrodes 11 and the separator sheet 122 stacked on an upper surface of the table. More preferably, the upper surface of the table 16 is formed substantially flat so that the electrode 11 and the separator sheet 122 can be stably stacked.

As in the example shown, the table 16 may be arranged between first and second electrode supply units configured for conveying the electrodes 11, and in particular between the first electrode reel 111 and the second electrode reel 112. In this manner, the table 16 may be rotated and reciprocated between the first electrode reel 111 and the second electrode reel 112 to facilitate placement of the electrodes 11 on or over the table to be supported by the table during the manufacturing of the electrode assembly. For example, the table 16 may be rotated in a reciprocating motion between the first electrode reel 111 and the second electrode reel 112 at an angle in a range of 0 degrees to 180 degrees with respect to a horizontal plane within which the table is considered to be in a horizontal state at 0 and 180 degrees. However, the rotation angle of the table 16 is not limited to this angle range and may be rotated at various angles, including but not limited to greater angle ranges and more restrictive angle ranges. Thereby, the table 16 can be rotated in a reciprocating motion between the first electrode reel 111 and the second electrode reel 112 so that the folding operation of the separator sheet 122 by the separator guide 125 can be assisted and, at the same time, the electrodes 11 can be stacked more quickly on the table 16. In this regard, process speed and efficiency can be further improved.

The electrode assembly manufacturing apparatus 1 according to the present example may further include a first transfer device 141 that transfers, e.g., by conveying, the first electrode 1112 toward the table 16 and a second transfer device 142 that transfers, e.g., by conveying, the second electrode 1122 towards the table 16. Here, the first transfer device 141 may transfer the first electrode 1112, which is formed by cutting the first electrode sheet 1111 unwound from the first electrode reel 111, toward the table 16. Further, the second transfer device 142 may transfer the second electrode 1122, which is formed by cutting the second electrode sheet 1121 unwound from the second electrode reel 112, toward the table 16.

Thereby, in the present example, the first electrode 1112 and the second electrode 1122 can be respectively transferred to both sides of the table 16 through the first transfer device 141 and the second transfer device 142, to more easily alternately stack the first electrode 1112 and the second electrode 1122 on the separator sheet 122.

Particularly, in the present example, as the table 16 rotates reciprocally between the first electrode reel 111 and the second electrode reel 112, the table 16 can be rotated to be adjacent to each of the first transfer device 141 and the second transfer device 142. Thereby, in the present example, the electrodes 11 transferred from the first transfer device 141 and the second transfer device 142 can be quickly stacked on the table 16.

The electrode assembly manufacturing apparatus 1 may include headers (or heads) 151a and 152a that pick up, e.g., by adsorbing, the electrodes 11 and seat the electrodes on the separator sheet 122. More specifically, the headers 151a and 152a may further include a first header 151a that picks up, e.g., by adsorbing, the first electrode 1112 and seats the first electrode on the separator sheet 122 and a second header 152 that picks up, e.g., by adsorbing, the second electrode 1122 and seats the second electrode on the separator sheet 122. Here, each of the first header 151a and the second header 152a can rotate reciprocally, and independently of the other header, toward and away from the table 16. In this manner, the first header 151a and the second header 152a can rotate reciprocally in rotational directions such that bottom portions, e.g., bottom surfaces, of the headers face toward the upper surface of the table 16.

More specifically, the first header 151a may pick up the first electrode 1112 transferred from the first transfer device 141 toward the table 16, and the second header 152a may pick up the second electrode 1122 transferred from the second transfer device 142 toward the table 16.

Particularly, in the present example, the table 16 is rotatable to be adjacent to the first transfer device 141 and the second transfer device 142, respectively, and the first header 151a and the second header 152a may be rotated by reciprocating motions toward the table 16. Thereby, in the present example, the first header 151a and the second header 152a can move the electrodes 11 onto and over the table 16 being rotated to face the respective header such that each of the headers can stably seat each of the electrodes 11 on incremental respective sections of the separator sheet 122.

Further, the headers 151a and 152a measure whether or not the first electrode 1112 or the second electrode 1122, respectively, is misaligned for each of first electrode 1112 or second electrode 1122 and then correct the position of any misaligned electrode as necessary. In this manner, the headers 151a and 152a are able to precisely seat the electrodes 11 at desired (e.g., target) positions on the separator sheet 122 located on the table 16. Thereby, in the present example, the degree of alignment between each of the electrodes 11 and the separator sheet 122 stacked on the table 16 may be further improved.

Referring to FIG. 2, in the electrode assembly manufacturing apparatus 1 according to the present example, the electrodes 11 may be seated on the separator sheet 122 in a state where an adhesive is applied to at least a part of the lower portion (e.g., bottom surface) of the electrodes 11. More specifically, in the present example, an adhesive may be applied to at least a part of the lower portion of the electrodes 11 while the electrodes are supported by or otherwise located at the transfer devices 141 and 142, or an adhesive may be applied to at least a part of the lower portion of the electrodes 11 while the electrodes are picked up by, e.g., adsorbed to, the headers 151a and 152a.

Figure 3:
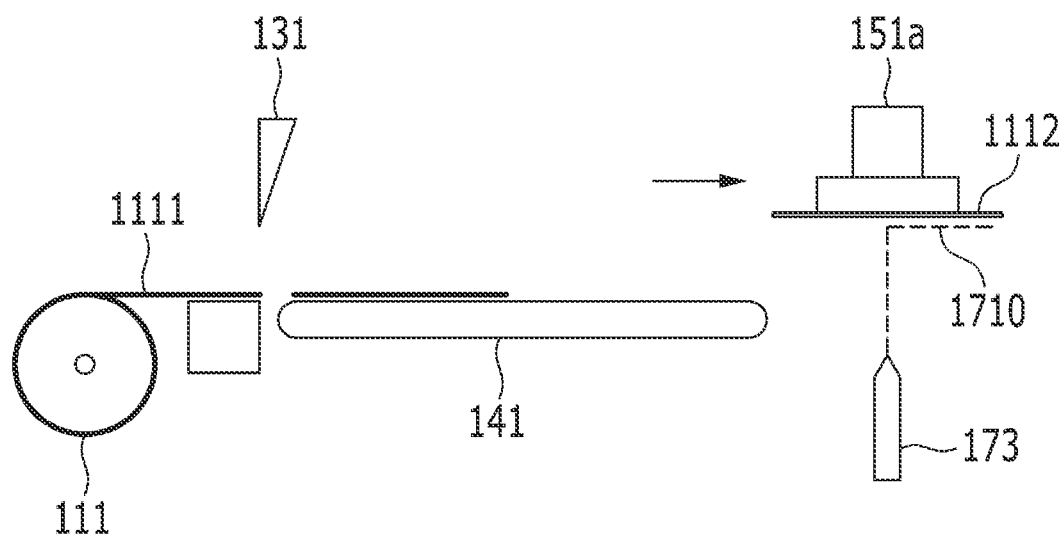
FIG. 3 is a schematic elevation view of an optional portion of the apparatus of FIG. 2, which shows a state in which an adhesive is being applied to a lower portion of a first electrode.
Figure 4:
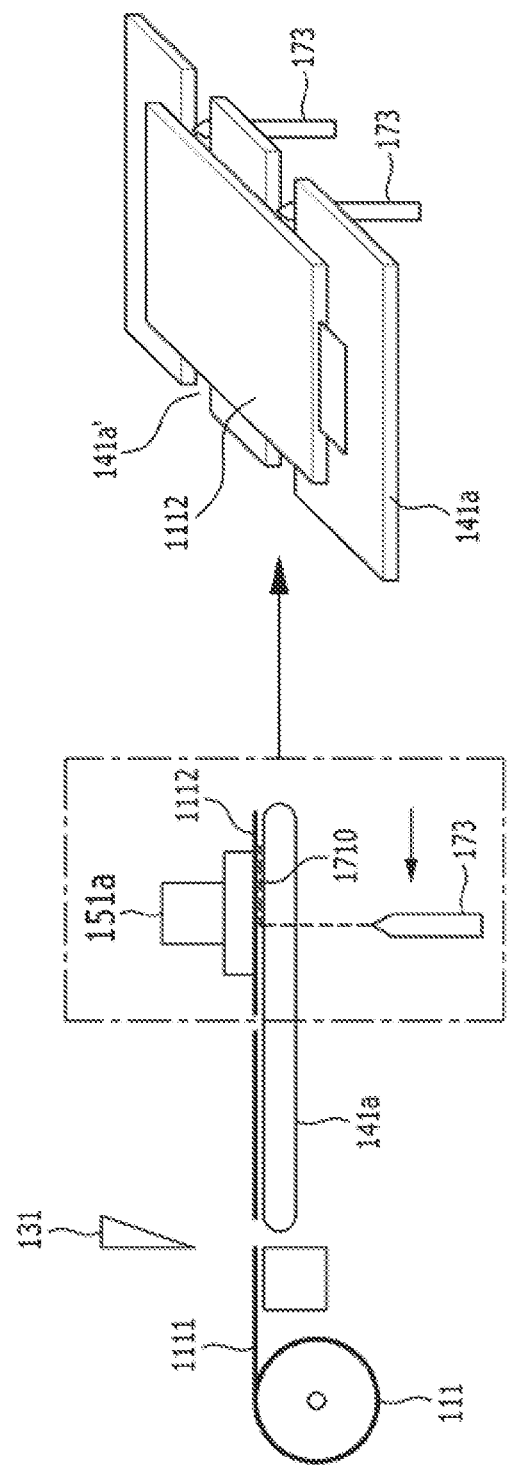
FIG. 4 shows schematic elevation and perspective views, respectively, of an optional portion of the apparatus of FIG. 2, in particular showing a state in which an adhesive is being applied to the lower portion of the first electrode and a state prior to that state in which the first electrode is seated on a transfer device and awaiting application of the adhesive, respectively.

Referring to FIGS. 3 and 4, the electrode assembly manufacturing apparatus 1 according to the present example may include a lower nozzle 173 that applies an adhesive to at least a part of a lower portion of the first electrode 1112. More specifically, the lower nozzle 173 may apply an adhesive to at least a part of the lower surface of the first electrode 1112. Thereby, a first adhesive layer 1710 may be formed on the lower surface of the first electrode 1112.

In one example, referring to FIG. 3, when the first electrode 1112 is being carried by the first header 151a, the lower nozzle 173 may apply an adhesive to at least a part of the lower portion of the first electrode.

In another example, referring to FIG. 4, the first transfer device 141a includes a first opening, e.g., groove 141a", that exposes the lower surface of the first electrode 1112 to the lower nozzle 173 such that the lower nozzle 173 can apply an adhesive to at least a part of the lower portion of the first electrode 1112 through the first opening. Here, the first transfer device 141a may be configured with at least one first opening and may be configured with a plurality of first openings, e.g., a plurality of grooves 141a", arranged along the first transfer device and spaced apart from each other. Further, as shown in FIG. 4, the first opening or first openings, e.g., groove or grooves 141a", may extend along a width direction of the first electrode 1112. However, the possible configurations of the openings for the first transfer device 141a are not limited to these configurations and can be configured in various other forms, such as with an array of holes, slits extending in various directions, and any other form providing one or more openings that allow a sufficient amount of the adhesive to be deposited on the lower portion of the first electrode 1112. In such arrangements, the one or more openings may be sufficiently small so as to provide enough surface contact between the first transfer device 141a and the first electrode 1112 such that the first transfer device can convey the first electrode towards the table 16.

Here, the first electrode 1112 is described as an example for convenience of explanation. However, an adhesive may also be applied by a lower nozzle to the second electrode 1122 in a similar manner while the second electrode is being carried by the second header 152 or is being transferred by the second transfer device 142. In some such arrangements, the lower nozzle may be the lower nozzle 173 in which the lower nozzle 173 is configured to translate between locations below the first header 151 and the second header 152 when the adhesive is applied to a lower portion of the second electrode 1122 while the second electrode is being carried by the second header 152 or in which the lower nozzle 173 is configured to translate between locations below the first transfer device 141 and the second transfer device 142 while the second electrode is being transferred by the second transfer device 142. In other such arrangements, an additional lower nozzle in the same form as the lower nozzle 173 may be utilized for applying adhesive to the second electrode 1122 while the lower nozzle 173 is utilized for the first electrode 1112.

Thereby, the electrode assembly manufacturing apparatus 1 according to the present example can apply an adhesive to at least a part of the lower portion of the electrodes 11 in the process of transferring the electrodes 11, which is thus advantageous in that the convenience and speed of the process can be improved.

The adhesive is preferably uniformly applied to the lower portion of the electrode 11. However, when the adhesive is completely applied to the entire surface of the lower portion of the electrode 11, the amount of the adhesive applied may be excessively large. In such a case, the adhesive may flow to the outside of the separator sheet 122 to contaminate other portions. In this instance, when the secondary battery is manufactured, the power generation function of the battery may not be smooth or may be otherwise degraded.

Therefore, in the present example, the adhesive preferably is applied to the lower portion of the electrode 11 by, for example, a spot application method of applying the adhesive in a spot (e.g., as a plurality of spots) or by a line application method of applying the adhesive in a line (e.g., as a plurality of lines). That is, the first adhesive layer 1710 may be preferably formed in a spot pattern or a line pattern or in a combination of these patterns.

In contrast, if the amount of the adhesive applied is too small, the electrodes 11 may not be fixed or may not be fixed sufficiently to the separator sheet 122 while the electrode assembly is being moved and thus can be displaced from a fixed position in the electrode assembly. Therefore, it may be preferable that the interval or intervals between each of the regions to which the adhesive is applied are not excessively wide.

Further, the adhesive is applied to the surfaces of the electrodes 11 when applied to the lower portions of the electrodes 11 and is preferably applied in a minimum amount that can secure the adhesive force between the electrodes 11 and the separator sheet 122. In contrast, when the adhesive is applied directly onto the separator sheet 122, the separator sheet 122 absorbs a part of the adhesive, which may undesirably cause a larger amount of adhesive to be applied in order to secure the adhesive force between each of the electrodes 11 and the separator sheet 122.

The adhesive may be dissolved in an electrolytic solution, in preferably the electrolytic solution with which the adhesive layer is contained in a battery cell. More specifically, when the first adhesive layer 1710 formed on the lower portions of the electrodes 11 is impregnated with an electrolytic solution, the adhesive contained in the first adhesive layer 1710 may be dissolved in the electrolytic solution. Here, the adhesive being dissolved may mean that the adhesive is dissolved into the electrolytic solution. That is, it may mean that the region of the first adhesive layer 1710 formed on the lower portion of the electrode 11 is reduced such that only a part of the adhesive is dissolved, or the first adhesive layer is completely eliminated so that the first adhesive layer does not remain in the lower portion of the electrode 11.

In one example, the adhesive may be an acrylate-based adhesive. Thereby, in the present example, when the acrylate-based adhesive is applied as the adhesive to the lower portion of the electrodes 11, the adhesive may be dissolved into the electrolytic solution contained in the final battery cell.

Thereby, in the present example, the first adhesive layer 1710 can fix the electrode 11 to the separator sheet 122 in the manufacturing process to prevent the displacement of the electrode from a fixed position in the electrode assembly. In addition, the first adhesive layer 1710 may be dissolved in the electrolytic solution contained in the final battery cell, and thus may not hinder the movement of lithium ions between the electrode and the separator, thereby further improving the performance of the battery cell.

Figure 5:
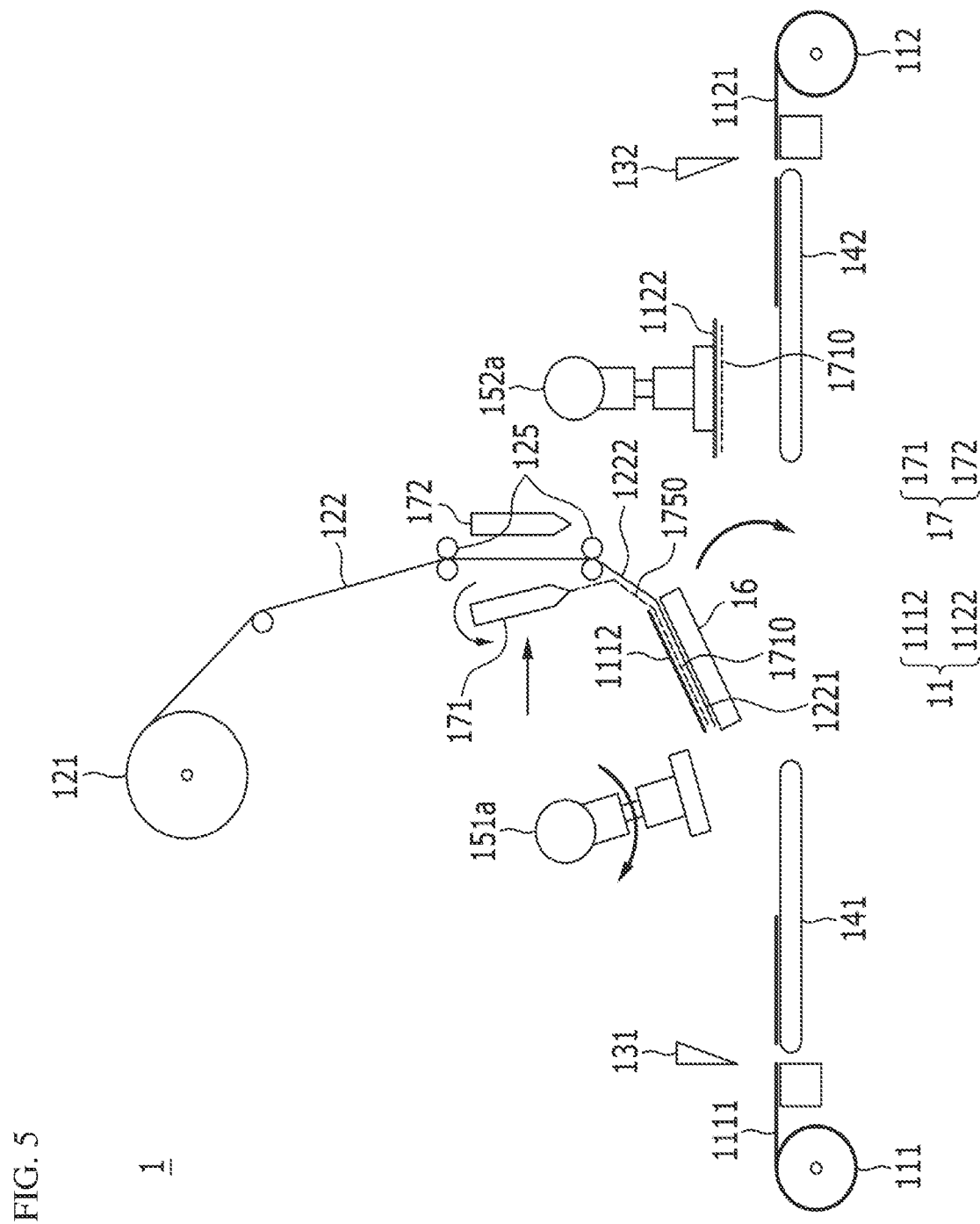
FIGS. 5 and 6 are schematic elevation views of the apparatus of FIG. 2, which show a state in which a table is being rotated and moved a separator guide and a first upper nozzle are being linearly moved, and the adhesive is being applied to a second section while the first upper nozzle rotates.
Figure 6:
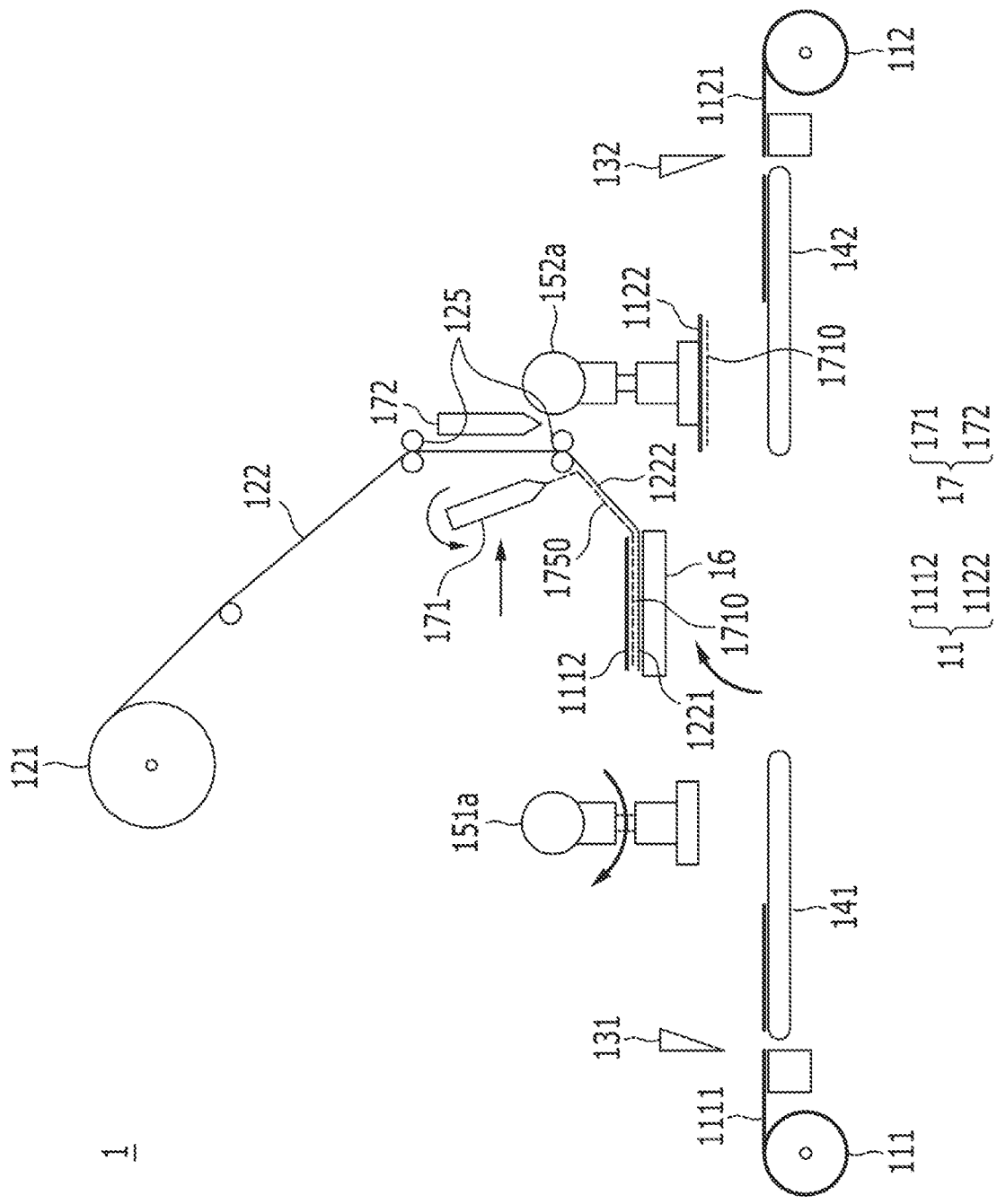

Referring to FIGS. 2, 5, and 6, the pair of upper nozzles 17 each apply an adhesive to at least a part of the separator sheet 122 located between the table 16 and the separator guide 125. More specifically, the pair of upper nozzles 17 include a first upper nozzle 171 that applies an adhesive to at least a part of a surface opposite a second region 1222 of the separator sheet 122 and a second upper nozzle 172 that applies an adhesive to at least a part of an additional first region 1221, e.g., a third region, of a third section of the separator sheet 122.

Here, the first region 1221 of the separator sheet 122 refers to a region on the separator sheet 122 to which the first electrode 1112 is attached and which is part of a first section of the separator sheet. In some cases in the present disclosure, the first region 1221 refers to a different region, e.g., a third region, in the separator sheet 122 to which a further first electrode 1112 may be attached while the separator sheet is covering the second electrode 1122. Further, the second region 1222 of the separator sheet 122 refers to a region on the separator sheet 122 to which the second electrode 1122 is attached while the separator sheet is covering the first electrode 1112. The second region 1222 is part of a second section of the separator sheet, in which the first and second sections of the separator sheet may refer to flat portions of a separator sheet overlying the table 16 when the separator sheet is folded over the table. In other words, the first electrode 1112 is seated on the first region 1221 of the separator sheet 122, and the second electrode 1122 is seated on the second region 1222 of the separator sheet 122.

The first upper nozzle 171 may apply the adhesive to the surface that covers the first electrode 1112 seated on the first region 1221 of the separator sheet 122. That is, the first upper nozzle 171 may apply the adhesive to a surface opposite to the surface to which the second electrode 1122 is attached on the second region 1222 of the separator sheet 122.

Further, the second upper nozzle 172 may apply the adhesive to a surface that covers the second electrode 1122 seated on the second region 1222 of the separator sheet 122. That is, the second upper nozzle 172 may apply the adhesive to a surface opposite to the surface to which an additional first electrode 1112 may be attached on the additional first region 1221 of the separator sheet 122.

Further, the first upper nozzle 171 and the second upper nozzle 172 may be arranged on opposing sides of the separator sheet 122. In some arrangements (not shown), before the surface opposite the second region 1222 of the separator sheet 122 covers the upper portion of the first electrode 1112, the first upper nozzle 171 may apply an adhesive to at least a part of an upper portion of the first electrode 1112 to form a second adhesive layer 1750. Further, as described further herein with respect to FIG. 8, in some arrangements and before the surface opposite the first region 1221 of the separator sheet 122 covers the upper portion of the second electrode 1122, the second upper nozzle 172 may apply an adhesive to at least a part of an upper portion of the second electrode 1122 to form a further second adhesive layer 1750.

Further, the pair of upper nozzles 17 may be moveable, e.g., linearly reciprocate, toward and away from the table 16. That is, the pair of upper nozzles 17 may apply an adhesive to at least a part of the respective surfaces opposite the additional first region 1221 or opposite the second region 1222 of the separator sheet 122 while moving linearly and reciprocally over and beyond the table 16.

As an example, referring to FIGS. 2, 5, and 6, the first electrode 1112 may be seated on the first region 1221 of the separator sheet 122 while the first upper nozzle 171 moves, e.g., linearly, over the surface opposite the second region 1222 of the separator sheet 122. Here, the first upper nozzle 171 may apply the adhesive to at least a part of the surface opposite the second region 1222 while moving, e.g., linearly, in a direction away from the table 16. Additionally, as described further herein with respect to FIG. 8, the second electrode 1122 may be seated on the second region 1222 of the separator sheet 122 while the second upper nozzle 172 moves, e.g., linearly, over the surface opposite the first region 1221 of the separator sheet 122. Here, the second upper nozzle 172 may apply the adhesive to at least a part of the surface opposite the first region 1221 while moving, e.g., linearly in a direction away from the table 16.

Further, the details of the application of the adhesive by the pair of upper nozzles 17 may be similar to the details of the application of the adhesive by the lower nozzle 173 described above.

Further, the pair of upper nozzles 17 may be moveable, e.g., reciprocate linearly left and right, either simultaneously or individually relative to the table 16. More preferably, the pair of upper nozzles 17 can reciprocate left and right at the same time relative to the table 16. As an example, the first upper nozzle 171 may apply an adhesive while traveling in a first direction from one side to the other side of the surface opposite the second region 1222 located on the right side of the table 16 as shown in FIGS. 5 and 6, and the second upper nozzle 172 may apply an adhesive while traveling in a second direction from the other side to the one side of the first region 1221 located on the left side of the table 16, as will be described further herein with respect to FIG. 8.

Thereby, in the present example, the process time of the adhesive application process using the pair of upper nozzles 17 can be reduced, and the process efficiency can be further improved. Additionally, the adhesive application process of the pair of upper nozzles 17 can be performed simultaneously with the process of seating the electrodes 11 on the separator sheet 122, so that process efficiency can be further improved.

Further, in the present example, as the table 16 rotates reciprocally towards the electrodes 11, either one of or both the relative position between the pair of upper nozzles 17 and the separator sheet 122 and the relative angle between the separator sheet and the flow of adhesive from the pair of upper nozzles can change without additional modifications to the apparatus 1. Thereby, either one of or both the adhesive application interval and the amount of the adhesive applied to the separator sheet 122 from the pair of upper nozzles 17 may undesirably become non-uniform.

To address this issue, according to another example of the present disclosure, as shown in FIGS. 5 and 6, when the pair of upper nozzles 17 apply the adhesive on the separator sheet 122, respectively, an end part, e.g., a tip, of the first upper nozzle 171 or an end part, e.g., a tip, of the second upper nozzle 172 may be rotated toward or away from the separator sheet 122, and in some arrangements, toward the separator sheet so as to be adjacent to the separator sheet 122. The pair of upper nozzles 17 may rotate in a direction in which an end part of the first upper nozzle 171 or an end part of the second upper nozzle 172 faces the upper surface of the separator sheet 122. In other words, the pair of upper nozzles 17 can adjust the angle between the direction the adhesive is expelled from the end part of the first upper nozzle 171 or the direction the adhesive is expelled from the end part of the second upper nozzle 172 and the upper surface of the separator sheet 122, respectively.

In one example, the pair of upper nozzles 17 are rotated, e.g., continuously during an application of the adhesive, so that the angle between the end part of the first upper nozzle 171 or the end part of the second upper nozzle 172 and the upper surface of the separator sheet 122 is constant. However, the rotation angle or angles of the pair of upper nozzles 17 is not limited to this configuration and can be other angles as long as the angles are those at which the adhesive application interval becomes uniform.

Further, although not shown in FIGS. 2, 5 and 6, for the pair of upper nozzles 17, the upper nozzles can be moved in directions in which the end part of the first upper nozzle 171 or the end part of the second upper nozzle 172 is adjacent to the separator sheet 122.

In one example, the pair of upper nozzles 17 are moved so that the distance between the end part of the first upper nozzle 171 or the end part of the second upper nozzle 172 and the upper surface of the separator sheet 122 is adjusted to be constant. However, the positions of the pair of upper nozzles 17 are not limited to these positions, and can be various other positions as long as at those positions the application interval of the adhesive becomes uniform.

Thereby, the present example adjusts either one of or both the angle of alignment or position of the pair of upper nozzles 17 so that either one of or both the application interval and the application amount of the adhesive applied from the pair of upper nozzles 17 can be made more uniform and so that the quality of the electrode assembly can be further improved.

Figure 7:
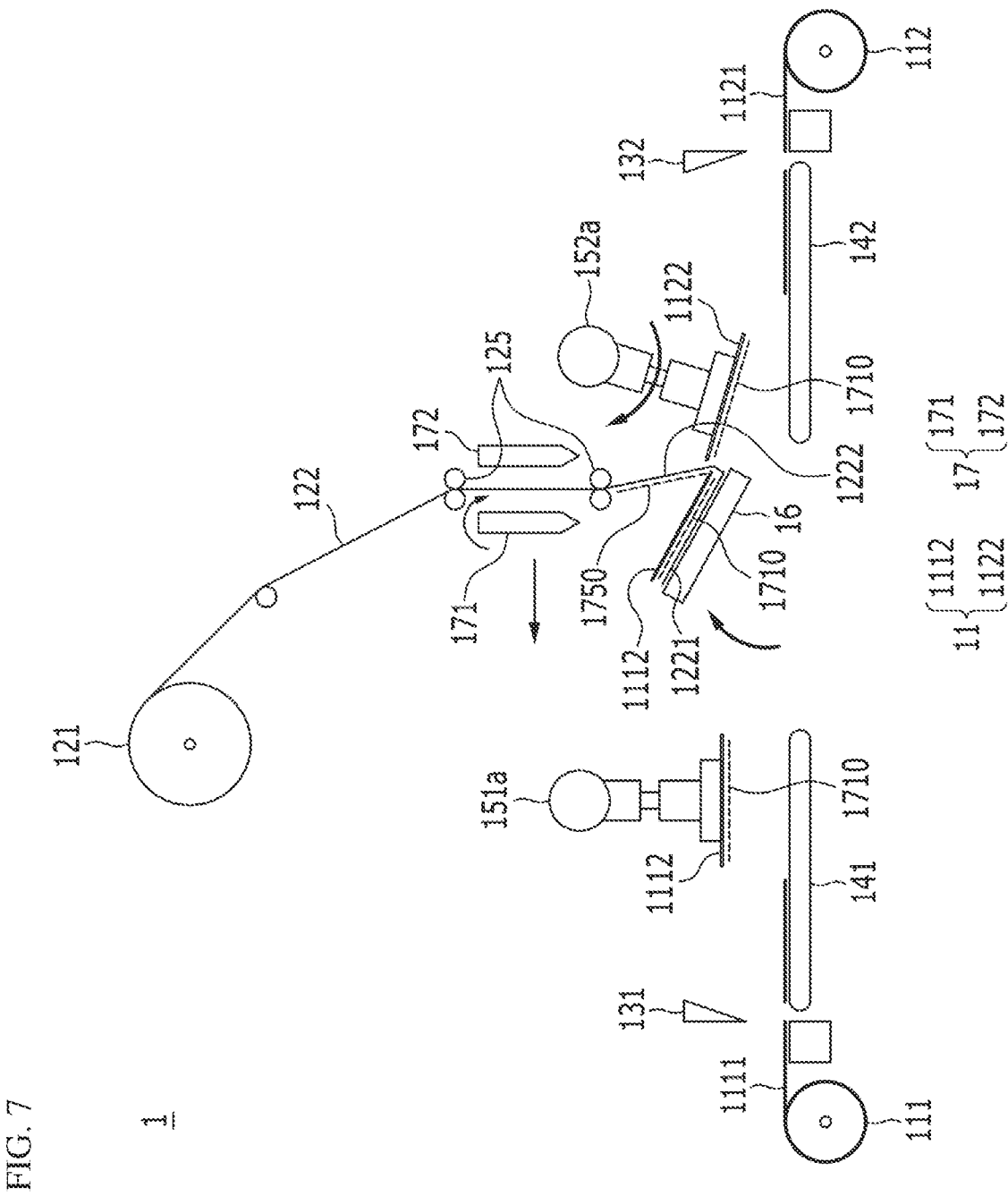
FIG. 7 is a schematic elevation view of the apparatus of FIG. 2, which shows a state in which the second section of the separator sheet applied with the adhesive is being folded to cover the first electrode while the separator guide is being linearly moved counter to a rotational direction of the table.

Referring to FIGS. 5 to 7, in the present example, a folding direction of the separator sheet 122 can be guided by the separator guide 125. More specifically, the separator guide 125 is moveable, e.g., can linearly reciprocate left and right, relative to the table 16.

In one example, the separator guide 125 may have a form in which a pair of rollers are arranged at a same height above the table 16 when the table is horizontally arranged below the rollers. The separator sheet 122 may be inserted between the pair of rollers in which each of the rollers can press and thereby guide the separator sheet. However, the shape of the separator guide 125 is not limited to this configuration, and can have other forms as long as the separator guide is configured for controlling the folding direction of the separator sheet 122.

Further, the separator guide 125 may include pairs of rollers located above and below the pair of upper nozzles 17 such that a plane extending between the pairs of the rollers passes between the pair of upper nozzles. However, the position and number of the separator guides 125 are not limited to this configuration, and other roller positions and quantities may be used so long as the separator guide is configured for controlling the folding direction of the separator sheet 122.

Here, the separator guide 125 may move, e.g., reciprocate left and right, relative to the table 16 together and thereby simultaneously with the pair of upper nozzles 17, or the separator guide 125 and the pair of upper nozzles 17 may move, e.g., reciprocate left and right, respectively and independently. In arrangements in which the separator guide 125 and the pair of upper nozzles 17 do not move in tandem, each one of the pair of upper nozzles 17 additionally may move independently from the other.

More preferably, the first upper nozzle 171 applies the adhesive to at least a part of the surface opposite the second region 1222 of the separator sheet 122, and at the same time, the separator guide 125 moves, e.g., linearly, in a first direction generally away from the table, e.g, toward the second electrode reel 112 or the second transfer device 142. Further, as described further herein with respect to FIG. 8, the second upper nozzle 172 applies the adhesive to at least a part of the surface opposite the additional first region 1221, i.e., the third region, of the separator sheet 122, and at the same time, the separator guide 125 may move, e.g., linearly, in a second direction generally away from the table, e.g., toward the first electrode reel 111 or the first transfer device 141.

Thereby, the separator guide 125 maneuvers the separator sheet 122 to form a region where the adhesive can be applied onto the separator sheet 122 from the first upper nozzle 171 or the second upper nozzle 172 and thereby assists the adhesive application process of the pair of upper nozzles 17.

Further, when the separator guide 125 linearly reciprocates toward the first transfer device 141 and the second transfer device 142 relative to the table 16, the separator sheet 122 guided by the separator guide 125 may be folded along the moving direction of the separator guide 125 so that the separator sheet 122 can cover the electrode 11.

In one example, referring to FIG. 7, in a state in which the first electrode 1112 is seated on the first region 1221 of the separator sheet 122, the separator guide 125 moves linearly toward the first transfer device 141 so that the surface opposite the second region 1222 of the separator sheet 122 can cover the upper portion of the first electrode 1112.

More specifically, when the adhesive application of the first upper nozzle 171 is completed as shown in FIG. 6, the separator guide 125 moves, e.g., linearly, in a direction in which the surface opposite the second region 1222 of the separator sheet 122 applied with the adhesive to cover the first electrode 1112 as shown in FIG. 7. Similarly, when the adhesive application of the second upper nozzle 172 is completed, the separator guide 125 moves, e.g., linearly, in a direction in which the surface opposite is configured such that the surface opposite the additional first region 1221 of the separator sheet 122 to which the adhesive is applied covers the second electrode 1122.

Thereby, as in the present example, the separator guide 125 may perform the folding process of the separator sheet 122 while assisting the adhesive application process of the pair of upper nozzles 17 so that processing time can be reduced and the process efficiency can be further improved.

Figure 8:
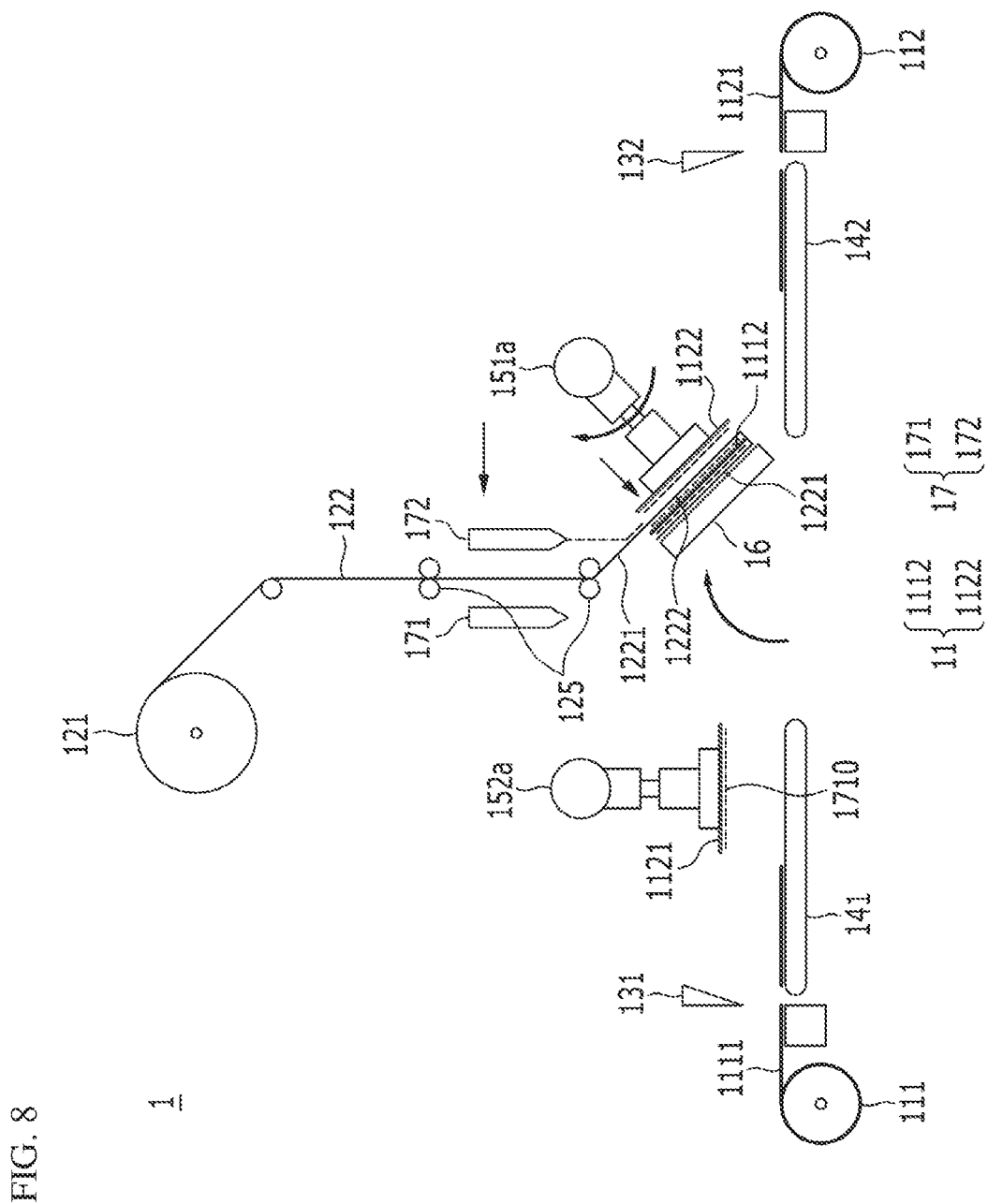
FIG. 8 is a schematic elevation view of the apparatus of FIG. 2, which shows a state in which the second electrode is being seated on the second section of the separator sheet.

Referring to FIGS. 2 and 8, in the electrode assembly manufacturing apparatus 1 according to the present example, the table 16 can rotate, e.g., toward the second electrode reel 112 or the second transfer device 142, to receive the second electrode 1122 in a similar manner to the rotation of the table to receive the first electrode 1112. At the same or at a different time, the second electrode 1122 may be rotated by the second header 152*a* carrying, e.g., by adsorbing, the second electrode in which the second header may be rotated reciprocally. In one example, as shown in FIG. 8, in a state where the second electrode 1122 is carried by, e.g., adsorbed to, the second header 152*a*, the second header 152*a* can rotate so as to be located at the upper portion of the table 16. In this manner, the second electrode 1122 may be seated onto the second region 1222 of the separator sheet 122. In addition, the details of the interaction of the second electrode 1122 and the second header 152*a* similar to the interaction of the first electrode 1112 and the first header 151*a* described previously herein.

Further, similarly to the first upper nozzle 171, the second upper nozzle 172 may move, e.g., linearly and reciprocally left and right, relative to the table 16. In one example, as the second upper nozzle 172 moves from one side of the surface of the separator sheet 122 opposite the first region 1221 located on the right side of the table 16 to the other side, an adhesive may be applied to at least a part of the surface of the separator sheet 122 opposite the first region 1221. In addition, the details of the configuration and operation of the second upper nozzle 172 similar to the first upper nozzle 171 described previously herein.

The electrode assembly manufacturing method according to an example of the present disclosure using the electrode assembly manufacturing apparatus 1 can be performed as follows (e.g., for manufacturing a unit cell for an electrode assembly).

First, referring to FIGS. 1 and 2, when the first electrode sheet 1111 is unwound from the first electrode reel 111, the first cutter 131 cuts the first electrode sheet 1111 to form a plurality of first electrodes 1112 (S101).

Meanwhile, when the separator sheet 122 is unwound from the separator reel 121, the separator sheet is seated on the upper surface of the table 16 (S102). At this time, the table 16 can rotate toward the first electrode reel 111 or the first transfer device 141 in a state in which the separator sheet 122 is seated on the table.

Further, the lower nozzle 173 applies an adhesive to the lower portion of the first electrode 1112 (S103). In one example, as shown in FIG. 3, in a state where the first header 151*a* is carrying, e.g., by adsorbing, the first electrode 1112, the lower nozzle 173 applies an adhesive to the lower portion of the first electrode 1112. In another example, as shown in FIG. 4, the lower nozzle 173 applies the adhesive to the lower portion of the first electrode 1112 while the first transfer device 141*a* is transferring, e.g., by conveying, the first electrode 1112.

Further, referring to FIGS. 1 and 2, the first header 151*a* may move linearly to a location over the table 16 while carrying, e.g., in a state of adsorbing, the first electrode 1112. When the first header 151*a* is located above the table 16, as shown in FIG. 2, the first header 151*a* may seat the first electrode 1112 on which the first adhesive layer 1710 is formed on the first region 1221 of the separator sheet 122 (S104).

Further, referring to FIGS. 1, 5, and 6, when the first electrode 1112, with the first adhesive layer 1710 applied to the lower surface of the first electrode, is seated on the first region 1221 of the separator sheet 122, the first upper nozzle 171 may apply an adhesive to the surface of the separator sheet 122 opposite the second region 1222 of the separator sheet 122 (S105). In this manner, as the first upper nozzle 171 moves toward the second transfer device 142, the second adhesive layer 1750 may be formed on the surface opposite the second region 1222 of the separator sheet 122. During this adhesive application, the separator guide 125 and the first upper nozzle 171 may move, e.g., linearly, together.

Further, referring to FIGS. 1 and 7, in a state where the second adhesive layer 1750 is formed on the surface opposite the second region 1222 of the separator sheet 122, the separator guide 125 may move in a direction toward the first transfer device 141 such that the separator sheet 122 is folded whereby the surface opposite the second region 1222 of the separator sheet 122 covers the first electrode 1112 (S106).

Meanwhile, as shown in FIG. 2, when the second electrode sheet 1121 is unwound from the second electrode reel 112, the second cutter 132 cuts the second electrode sheet 1121. In this manner, a plurality of second electrodes 1122 are formed. When the second transfer device 142 transfers the second electrode 1122, the second header 152 picks up, e.g., adsorbs, the second electrode 1122. Here, similarly to the first electrode 1112, an additional first adhesive layer 1710 formed by applying an adhesive from the lower nozzle 173 or another lower nozzle may be located at the lower portion of the second electrode 1122.

And, as shown in FIG. 8, the table 16 rotates toward the second electrode reel 112 or the second transfer device 142 in a state in which the second electrode 1122 is to be seated on the second region 1222 of the separator sheet 122. When the surface opposite the second region 1222 of the separator sheet 122 covers the first electrode 1112, the second header 152*a* carrying, e.g., by adsorbing, the second electrode 1122 moves, e.g., by rotation, toward the second region 1222 and to a position for seating the second electrode 1122 on the second region 1222.

As further shown in FIG. 8, the second upper nozzle 172 applies the adhesive to the additional first region 1221 of the separator sheet 122. Here, as the second upper nozzle 172 moves toward the first transfer device 141, a second adhesive layer 1750 may be formed on the surface opposite the first region 1221 of the separator sheet 122. During this adhesive application, the separator guide 125 and the second upper nozzle 172 may move, e.g., linearly, together.

Then, in a state where at least a part of the second adhesive layer 1750 is formed on the surface of the first region 1221 of the separator sheet 122, the separator guide 125 may move in a direction toward the second transfer device 142 such that the separator sheet 122 is folded whereby the surface opposite the first region 1221 of the separator sheet 122 covers the second electrode 1122.

That is, by repeating the above processes, the electrode assembly manufacturing process according to an example of the present disclosure can be performed, e.g., to sequentially form a plurality of unit cells of the electrode assembly.

When such electrode assembly manufacturing process according to the examples of the present disclosure is performed, the adhesives are respectively applied to the upper and lower portions of the electrodes 11 at the time of stacking the electrodes 11 and the separator sheet 122 in a Z-folding type, thereby preventing or at least inhibiting the electrodes 11 from being displaced from a fixed position in the electrode assembly.

Figure 9:
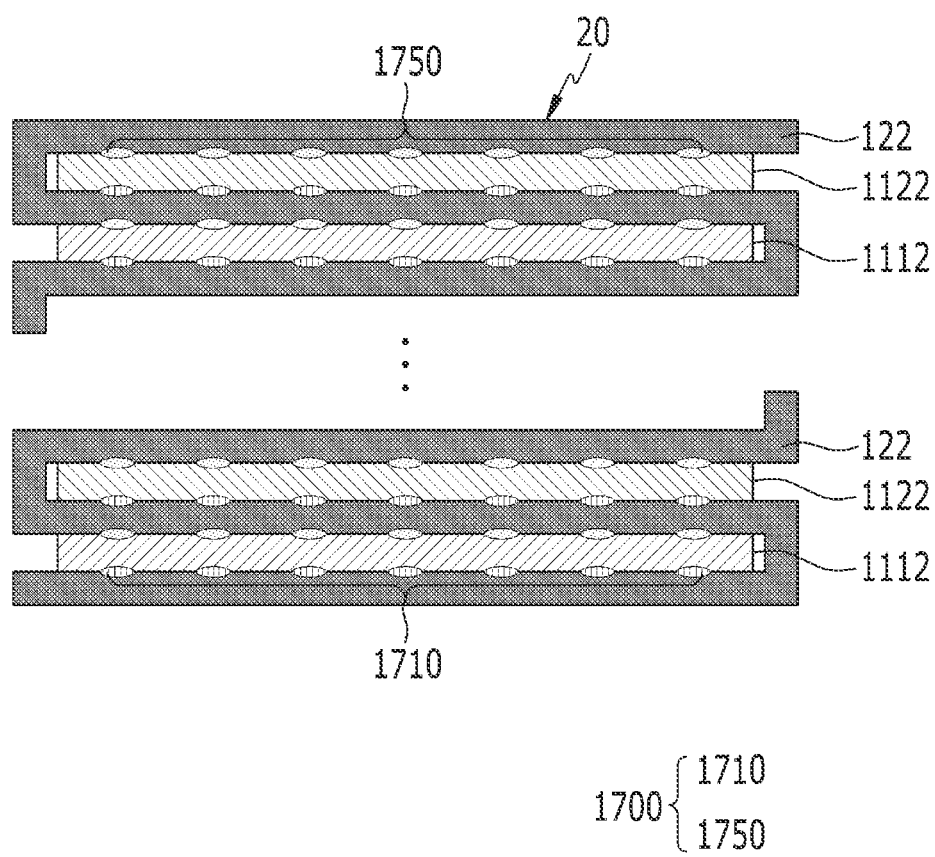
FIG. 9 is a cross-sectional elevation view of an electrode assembly according to an example of the present disclosure.

Referring to FIGS. 8 and 9, in the electrode assembly 10 in which electrodes and a separator sheet are alternately stacked according to another example of the present disclosure, the separator sheet 122 has a zigzag shape formed by being folded about at least a first electrode 1112 and a second electrode 1122.

Here, the separator sheet 122 is folded in a state where the first electrode 1112 is seated on the first region 1221 of the separator sheet so that the second region 1222 of the separator sheet covers the first electrode. Further, the separator sheet 122 is folded in a state where the second electrode 1122 is seated on the second region 1222 of the separator sheet so that the surface opposite the additional first region 1221 of the separator sheet covers the second electrode.

In particular, the electrode assembly 10 according to the present example may be configured such that the electrodes 11 are stacked one by one on the first region 1221 or the second region 1222 of the separator sheet 122. At this time, after measuring the presence or absence of misalignment, the electrode 11 can be stacked at an accurate position on the separator sheet 122 in a state where the position is corrected if necessary. Thereby, the electrode assembly 10 according to the present embodiment can be further improved in the degree of alignment between each of the electrodes 11 and the separator sheet 122.

Here, an adhesive layer 1700 is formed between each of the electrodes 11 and the separator sheet 122. More specifically, the adhesive layer 1700 includes a first adhesive layer 1710 and a second adhesive layer 1750. The first adhesive layer 1710 may be located between the lower portions of each of the electrodes 11 and the separator sheet 122, and the second adhesive layer 1750 may be located between the upper portions of each of the electrodes 11 and the separator sheet 122.

In one example, the first adhesive layer 1710 and the second adhesive layer 1750 may be formed by applying an adhesive in the form of a plurality of dots, respectively, as disclosed, for example, in U.S. Patent Application Publication No. 2022/0158304 A1, the disclosure of which is hereby incorporated by reference herein in its entirety. However, as described above in the battery cell manufacturing apparatus 1, the shapes of the first adhesive layer 1710 and the second adhesive layer 1750 are not limited to this configuration and may be formed in various shapes. For example, either one of or both the first adhesive layer 1710 and the second adhesive layer 1750 may be formed by applying an adhesive in the form of a plurality of lines, e.g., parallel lines, lattice, or other configurations. In some arrangements, an adhesive layer or adhesive layers having dots and lines may be utilized.

Thereby, the electrode assembly 10 according to the present example forms an adhesive layer 1700 between the electrode 11 and the separator sheet 122, and thus even in the case of a low-cost separator whose adhesive strength is relatively low, the electrodes 11 and the separator can be stably fixed to each other, and thereby prevent or at least inhibit the electrodes 11 from being displaced from their fixed positions in the electrode assembly. In addition, the electrode assembly 10 of the present example covers the upper and lower portions of each of the electrodes 11 in a shape in which a separator sheet 122 is folded so that the degree of alignment of the electrodes 11 and the efficiency of the process can be further improved.

Further, since there is no need to perform a laminating process as in the conventional case, it is possible to reduce the defective rate in the process caused by high heat and pressure. Moreover, since the laminator can be removed, the volume of the manufacturing apparatus can be reduced and the manufacturing process can be simplified.

The separator sheet 122 may, for example, comprises or consist of a flexible and electrically insulating material, in particular a porous, flexible and electrically insulating material, e.g., a resin film such as a polyolefin-based resin film.

The separator according to the example described herein may be a CCS (Ceramic Coated Separator. Generally, the separator may have a raw film and a coating layer formed on at least one surface of the raw film, in which the coating layer may include alumina powder and a binder for aggregating them. Safety Reinforced Separator (SRS) has a large amount of binder coated on the surface of the coating layer, but CCS may not have the binder coated on the surface of the coating layer or may have a much lower surface binder content as compared with SRS. For example, in the case of the CCS separator according to the present example, the content of the binder coated on the surface of the coating layer of the separator may be about 3 wt % or less, and in some other examples about 2 wt % or less, and in still other examples about 1 wt % or less.

When the separator is CCS, the internal electrode contained in the electrode assembly may be transferred in an unfixed state, and thus alignment may be disturbed during transfer. Of course, when the separator is CCS, it can be fixed with heat and pressure, but the alignment of the internal electrodes may be disturbed even in the process of transferring to the fixing device for heat and pressure after forming the stacked body of the electrode and the separator. Further, there is a disadvantage in that an expensive separator having a high binder content must be used in order to attach the electrode and the separator by heat and pressure. On the contrary, according to the present example, it is possible to increase the fixing force between the separator and the electrodes while preventing the alignment of the internal electrodes from being disturbed during transfer.

Figure 10:
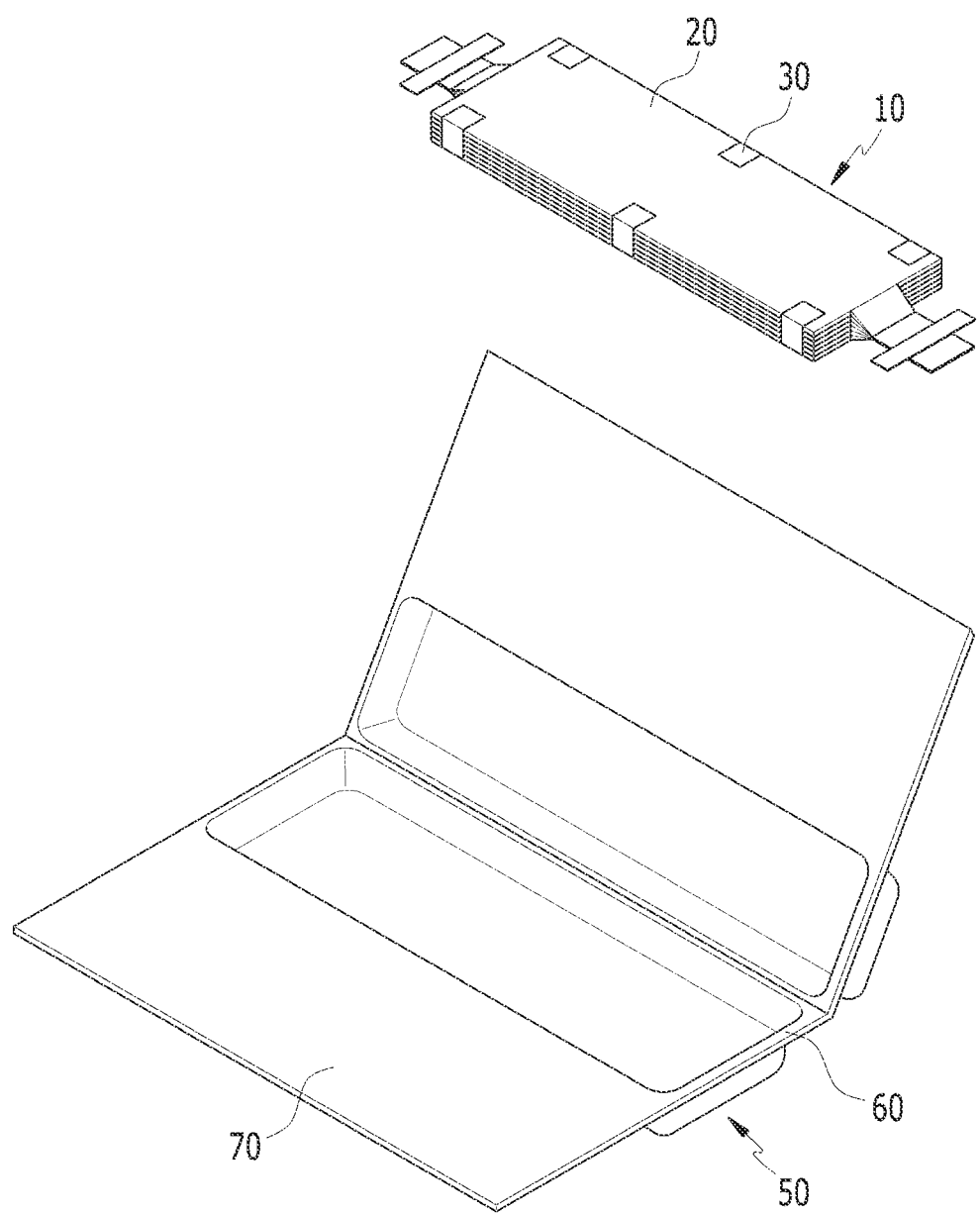
FIG. 10 is an exploded perspective view of a battery cell according to an example of the present disclosure.

Referring to FIGS. 2, 9, and 10, a battery cell according to an example of the present disclosure is a battery cell including the electrode assembly 10 described above, in which the battery cell includes a battery case 50 for housing the electrode assembly 10 together with an electrolytic solution. The adhesive layer 1700 may be dissolved (e.g., partially or entirely) in the electrolytic solution, e.g., by application of either one of or both heat and pressure.

Here, a fixing member such as a fixing tape 30 may be attached to the outside of the electrode assembly 10. Thereby, the stacked alignment state of the electrode 11 and the separator sheet 122 can be maintained. The electrode assembly 10 to which the fixing tape 30 is attached may be referred to as a final electrode assembly 20.

The battery case 50 includes an electrode assembly 10, a receiving part 60 to which the final electrode assembly 20 is mounted, and a sealing part 70 for sealing the outer periphery of the receiving part 60. In one example, the battery case 50 may be a laminated sheet including a resin layer and a metal layer. More specifically, the battery case 50 may be made of a laminated sheet and may include an outer resin layer for forming the outermost shell, a blocking metal layer for preventing the penetration of a material, and an inner resin layer for sealing.

Further, the receiving part 60 of the battery case 50 may be configured to house an electrolytic solution together with the electrode assembly 10. Here, the adhesive layer 1700 contained in the electrode assembly 10 may be dissolved into the electrolytic solution. In particular, in the battery cell according to the present example, in an activation step such as a formation step, the adhesive layer 1700 contained in the electrode assembly 10 may be dissolved into an electrolytic solution under either one of or both high temperature and pressure conditions.

More specifically, in the battery cell according to the present embodiment, when the adhesive layer 1700 formed between the electrodes 11 of the electrode assembly 10 and the separator sheet 122 is dissolved into the electrolytic solution, the adhesive may hardly remain on the surface of the electrodes 11 (e.g., may be dissolved entirely or almost entirely) or may not be completely eliminated (e.g., may only be dissolved partially).

The separator sheet 122 may generally be a porous sheet. In this regard, a part of the adhesive may permeate into the separator sheet 122. However, even in the case of the adhesive layer 1700 penetrated into the separator sheet 122, the adhesive may be mostly dissolved in the electrolytic solution, or may be completely dissolved. In this process, traces of adhesive from the application of the adhesive layer 1700 may remain on the separator sheet 122.

Here, the application trace of the adhesive layer 1700 means that the adhesive component contained in the adhesive layer 1700 does not remain, but a part of the outer surface of the separator sheet 122 is deformed or otherwise modified by the adhesive layer 1700. However, the present disclosure is not limited thereto, and the application trace of the adhesive layer 1700 may mean traces that can confirm the prior application of the adhesive in various ways, like traces that can confirm with the naked eye the application of the adhesive. Thereby, the application trace of the adhesive layer 1700 formed on the separator sheet 122 may be formed at the same position as the position where the adhesive is applied.

Therefore, the battery cell according to the present example can prevent the performance degradation and realize excellent battery performance because the adhesive layer 1700 is completely or at least sufficiently dissolved on the surface of the electrode 11 or the separator 122, and the unreacted region due to the adhesive layer 1700 has completely or at least sufficiently disappeared.

Although preferred embodiments of the present disclosure have been described in detail above, the scope of the present disclosure is not limited thereto, and various modifications and improvements made by those skilled in the art using the basic concepts of the present disclosure, which are defined in the appended claims, also falls within the scope of the present disclosure.

DESCRIPTION OF REFERENCE NUMERALS

1: cell manufacturing apparatus
11: electrode
16: table
17: nozzle
111: first electrode reel
112: second electrode reel
121: separator reel
122: separator sheet
125: separator guide
131: first cutter
132: second cutter
141/141a: first transfer device
141a': first groove
142: second transfer device
151a: first header
152a: second header
171: first upper nozzle
172: second upper nozzle
173: lower nozzle
1111: first electrode sheet
1112: first electrode
1121: second electrode sheet
1122: second electrode
1221: first region
1222: second region
1710: first adhesive layer
1750: second adhesive layer

The invention claimed is:

1. An apparatus for manufacturing an electrode assembly, the electrode assembly including a plurality of electrodes and a separator folded in a zigzag manner around alternating side portions of each of the electrodes and covering upper and lower surfaces of each of the electrodes, the apparatus comprising:

a separator supply unit configured for supplying a separator sheet from which the separator is formed;
a table configured for supporting the plurality of electrodes and sections of the separator sheet;
a separator guide configured for guiding the separator sheet to fold in a particular folding direction; and
first and second upper adhesive supply units configured for applying an adhesive to respective ones of the sections of the separator sheet,
wherein the table is configured for rotation in a first rotational direction such that a first table side of the table moves closer to the second upper adhesive supply unit and in a second rotational direction such that a second table side of the table opposite the first table side moves closer to the first upper adhesive supply unit.

2. The apparatus for manufacturing an electrode assembly according to claim 1,
wherein the separator sheet includes a first section configured for supporting a first electrode of the plurality of electrodes seated on the first section of the separator sheet and a second section configured for supporting a second electrode of the plurality of electrodes seated on the second section of the separator sheet,
wherein the first upper adhesive supply unit is configured for applying the adhesive to at least a part of the second section of the separator sheet when the first section of the separator sheet is supported by the table, and
wherein the second upper adhesive supply unit is configured for applying the adhesive to at least a part of a third section of the separator sheet when at least the first electrode and the second section of the separator sheet are supported by the table.

3. The apparatus for manufacturing an electrode assembly according to claim 2, wherein either one or both of the first upper adhesive supply unit is configured for rotation such that an end part of the first upper adhesive supply unit moves toward the separator sheet and the second upper adhesive supply unit is configured for rotation such that an end part of the second upper adhesive supply unit moves toward the separator sheet.

4. The apparatus for manufacturing an electrode assembly according to claim 2, wherein the first upper adhesive supply unit and the second upper adhesive supply unit are arranged relative to the separator guide such that the separator sheet extends between the first upper adhesive supply unit and the second upper adhesive supply unit when the separator sheet is being supplied by the separator supply unit.

5. The apparatus for manufacturing an electrode assembly according to claim 2,
wherein the first upper adhesive supply unit is moveable and is configured such that when the first electrode is seated on the first section of the separator sheet, the first upper adhesive supply unit moves to a position over the second section of the separator sheet, and
wherein the second upper adhesive supply unit is moveable and is configured such that when the second electrode is seated on the second section of the separator sheet, the second upper adhesive supply unit moves to a position over the third section of the separator sheet.

6. The apparatus for manufacturing an electrode assembly according to claim 5,
wherein the separator guide is moveable and configured such that when the first upper adhesive supply unit applies the adhesive to the second section of the separator sheet, the separator guide moves in a first separator guide direction away from the table, and wherein the separator guide is moveable and configured such that when the second upper adhesive supply unit applies the adhesive to the third section of the separator sheet, the separator guide linearly moves in a second separator guide direction opposite the first separator guide direction.

7. The apparatus for manufacturing an electrode assembly according to claim 6, wherein upon completion of the adhesive application of the first upper adhesive supply unit to the second section of the separator sheet, the separator guide moves in the second separator guide direction and thereby moves the separator sheet such that the second section of the separator sheet applied with the adhesive covers the first electrode, and wherein upon completion of the adhesive application of the second upper adhesive supply unit to the third section of the separator sheet, the separator guide moves in the first separator guide direction and thereby moves the separator sheet such that the third section of the separator sheet applied with the adhesive covers the second electrode.

8. The apparatus for manufacturing an electrode assembly according to claim 2, comprising:

a lower adhesive supply unit configured for applying the adhesive to either one of or both a lower portion of the first electrode and a lower portion of the second electrode.

9. The apparatus for manufacturing an electrode assembly according to claim 8, further comprising:

a first electrode delivery unit configured for carrying the first electrode and then seating the first electrode on the first section; and a second electrode delivery unit configured for carrying the second electrode and then seating the second electrode on the second section, wherein the first electrode delivery unit and the second electrode delivery unit are configured for rotation in a reciprocating motion towards and away from the table.

10. The apparatus for manufacturing an electrode assembly according to claim 9, wherein, when the first electrode is being carried by the first electrode delivery unit, the lower adhesive supply unit applies the adhesive to the lower portion of the first electrode, and wherein, when the second electrode is being carried by the second electrode delivery unit, the lower adhesive supply unit or another lower adhesive supply unit applies the adhesive to the lower portion of the second electrode.

11. The apparatus for manufacturing an electrode assembly according to claim 10, further comprising:

a first transfer device configured for transferring the first electrode toward the table; and a second transfer device configured for transferring the second electrode toward the table, wherein the first transfer device and the second transfer device are arranged to be on opposite sides of the separator sheet when the separator sheet is being supplied by the separator supply unit.

12. The apparatus for manufacturing an electrode assembly according to claim 11, wherein the first transfer device comprises a first opening exposed to the first electrode so that the lower adhesive supply unit applies the adhesive to the lower portion of the first electrode via the first opening, and wherein the second transfer device comprises a second opening exposed to the second electrode so that the one of the lower adhesive supply unit or the another lower adhesive supply unit applies the adhesive to the lower portion of the second electrode via the second opening.

13. The apparatus for manufacturing an electrode assembly according to claim 1, wherein the separator guide, the first upper adhesive supply unit, the second upper adhesive supply unit, and the table are configured such that the respective sections of the separator sheet to which the first and the second upper adhesive supply units are configured for applying the adhesive extend between the separator guide and the table when the adhesive is applied by the respective ones of the first and the second upper adhesive supply units.

14. An apparatus for manufacturing an electrode assembly according to claim 1, wherein the separator guide and the first and the second upper adhesive supply units are configured for translating together over the table when the table is rotated.

* * * * *